(12) United States Patent
Azenkot et al.

(10) Patent No.: US 9,882,709 B2
(45) Date of Patent: Jan. 30, 2018

(54) TIMING RECOVERY WITH ADAPTIVE CHANNEL RESPONSE ESTIMATION

(71) Applicant: Applied Micro Circuits Corporation, Sunnyvale, CA (US)

(72) Inventors: Yehuda Azenkot, San Jose, CA (US); Bart R. Zeydel, El Dorado Hills, CA (US)

(73) Assignee: MACOM Connectivity Solutions, LLC, Lowell, MA (US)

( * ) Notice: Subject to any disclaimer, the term of this patent is extended or adjusted under 35 U.S.C. 154(b) by 0 days.

(21) Appl. No.: 15/151,154

(22) Filed: May 10, 2016

(65) Prior Publication Data

US 2017/0331619 A1    Nov. 16, 2017

(51) Int. Cl.
*H04L 7/00*    (2006.01)
*H04L 7/033*   (2006.01)
*H04L 25/03*   (2006.01)
*H04L 7/04*    (2006.01)

(52) U.S. Cl.
CPC ............. *H04L 7/04* (2013.01); *H04L 7/0087* (2013.01); *H04L 7/0331* (2013.01); *H04L 25/03019* (2013.01); *H04L 25/03261* (2013.01); *H04L 25/03292* (2013.01); *H04L 25/03949* (2013.01); *H04L 2025/03592* (2013.01); *H04L 2025/03636* (2013.01)

(58) Field of Classification Search
CPC . H04L 2025/03592; H04L 2025/03636; H04L 25/03019; H04L 25/03949
See application file for complete search history.

(56) References Cited

U.S. PATENT DOCUMENTS

| | | | |
|---|---|---|---|
| 9,397,867 B1* | 7/2016 | Azenkot | H04L 25/03019 |
| 2008/0111596 A1* | 5/2008 | Lee | H03L 7/0814 |
| | | | 327/153 |
| 2014/0146911 A1* | 5/2014 | Eliaz | H04B 1/16 |
| | | | 375/285 |
| 2015/0215138 A1* | 7/2015 | Dorman | H04L 25/03076 |
| | | | 375/233 |

* cited by examiner

Primary Examiner — Ross Varndell

(57) ABSTRACT

System and method of timing recovery for recovering a clock signal by using adaptive channel response estimation. The channel response estimation in the timing recovery loop is dynamically adapted to the current channel response that varies over time. More particularly, the channel estimation coefficients used in a channel estimator can be adapted based on an error signal representing the difference between a received signal at the timing recovery loop and an estimated signal output from a channel estimator. Further, to prevent undesirable interaction between the channel estimator and the overall timing recovery loop with respect to clock phase recovery, the adaptation of channel estimation can be controlled in terms of speed or time so as to reduce or eliminate the channel estimator's effect on clock phase correction.

16 Claims, 9 Drawing Sheets

TIMING RECOVERY WITH ADAPTIVE CHANNEL RESPONSE ESTIMATION

TECHNICAL FIELD

The present disclosure relates generally to the field of signal processing in communications and, more specifically, to the field of timing recovery in signal processing.

BACKGROUND OF THE INVENTION

In communications systems, a transmitter sends data streams to a receiver in symbols, such as bits of data. As the receiver clock is typically not synchronized with the transmitter clock, the receiver needs to correctly recover the clock from the received signal itself. In addition, when data is transmitted over a communication channel, it is usually distorted in terms of phase and amplitude due to various types of noise, such as fading, oscillator drift, frequency and phase offset, and receiver thermal noise. At the receiver, the system is also subject to noise and timing jitter in a time domain. Therefore, the receiver needs a timing recovery process to obtain symbol synchronization, particularly to correct the clock delay and derive the optimal clock phase that is used to sample the received signal and achieve the best Signal-to-Noise Ratio (SNR).

The distortion and noise introduced through signal propagation over a communication channel are characterized in terms of channel response, which is usually frequency and time-dependent. The receiver determines the channel response and accordingly compensates for the channel distortion and noise through a channel estimation process. The transmitted signal usually includes a reference signal (the so-called "pilot signal") or a training sequence for channel estimation purposes. Typically, a channel estimator determines the channel response (or channel impulse response) on the particular carrier frequency and time instant by comparing the actual received signal with an expected signal, e.g., one that the receiver would have received under ideal channel conditions.

FIG. 1 illustrates the configuration of a timing recovery loop 100 in a receiver according to the prior art. As illustrated, the timing recovery loop 100 includes an Analog-to-Digital Converter (ADC) 110, an equalizer 111, a channel estimator 112, a delay element 113, a phase detector 114, a loop filter 115, and a phase interpolator 116. A received analog signal $R_x$ 101 is converted to a digital signal $d_k'$ 102 and then supplied to the equalizer 111 and the delay element 113. The equalizer 111 is used to render a flat frequency response in the signal and output an equalized signal $a_k$ 103. The equalized signal $a_k$ 103 is supplied to the channel estimator 112 to generate an estimated signal $d_k$ 104. The channel estimator includes channel response logic that correlates the signal transmitted from the transmitter (or "the transmitted signal") and the received signal 101 at the receiver by using a mathematical relation of a set of coefficients. Thus, the estimated signal $d_k$ output from the channel estimator 112 is an estimation of the transmitted signal that incorporates the channel response. The delay element 113 delays the digital signal $d_k'$ 102 to output symbols that have been processed by the timing loop 100, and thereby their characteristics have become known to the loop 100.

The phase detector 114 generates a phase error based on the difference between the delayed signal output from the delayed element 113 and the estimated signal $d_k$ 104. The loop filter 115 averages the phase error. The phase interpolator adjusts the effective sampling frequency and phase based on the average phase error. As a result, a recovered clock signal 106 is generated from the phase interpolator 116 and, in turn, used to clock the ADC 110 for sampling as well as to clock downstream processing logic. The performance of symbol synchronization can be indicated by a SNR or other parameters related to the noise level in the data stream.

The channel estimator 112 includes a Finite-Impulse-Response (FIR) filter composed of multiple filter taps. The multiple filter taps correspond to a number of consecutive samples used to generate an estimated sample. Conventionally, the channel estimator fixes the coefficients of a channel estimation filter, for example, by setting fixed tap weights of the FIR filter. The fixed tap weights may be configured based on known or estimated characteristics of the channel. Unfortunately, fixed channel estimation is incapable of adapting to time-varying channel response, resulting in possible large channel estimation errors.

SUMMARY OF THE INVENTION

Disclosed herein provide systems and methods of timing recovery with adaptive channel estimation for communication channels having time-variant channel responses. Embodiments of the present disclosure employ channel estimation adaptation logic in a timing recovery loop to dynamically adapt channel estimation to the current channel response. The estimation adaptation may be performed by adapting the coefficients in a channel estimation filter based on an error signal representing a difference between the estimated signal and a received signal. In some embodiments, the channel estimation filter includes a Finite-Impulse-Response (FIR) filter with the tap weights controlled by the channel estimation adaptation logic. In some embodiments, the adaptation logic dynamically modifies a respective tap weight can be based on: a received signal at the timing loop; the estimated signal output from the channel estimation filter; and a step size, and according to a least-mean-square (LMS) process. By dynamically adapting the channel estimate to the current channel response, a timing recovery loop at a receiver can advantageously recover a clock with enhanced efficiency and precision.

According to another aspect of the present disclosure, to prevent interaction between the channel estimation and the timing recovery loop with respect to clock delay correction, the adaptation of channel estimation is controlled to restrict or eliminate the channel estimation filter's effect on clock delay correction, for example, by limiting the adaptation to a relatively short time and/or slow speed compared with those of the entire timing recovery loop. In some embodiments, upon a good Signal-to-Noise Ratio (SNR) being achieved, all of the FIR tap weights are frozen to fix the estimated channel response, while the timing recovery loop continues the clock recovery process. Alternatively, a set of selected tap weights are frozen while others continue to adapt. In some other embodiments, some or all of the step sizes are set to be small values to achieve a low adaptation speed relative to the timing recovery loop speed.

According to one embodiment of the present disclosure, a method of timing recovery for signals transmitted via serial link includes generating an equalized signal responsive to a digital input signal and generating an estimated signal responsive to the equalized signal according to an estimated channel response. The estimated channel response is dynamically adapted to the current channel response that varies with time. A recovered clock signal is generated based on the estimated signal.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

BRIEF DESCRIPTION OF THE DRAWINGS

Embodiments of the present invention will be better understood from a reading of the following detailed description, taken in conjunction with the accompanying figures, in which like reference characters designate like elements and in which.

TIMING RECOVERY WITH ADAPTIVE CHANNEL RESPONSE ESTIMATION

Overall, embodiments of the present disclosure provide a timing recovery mechanism for recovering a clock signal by using adaptive channel response estimation. Particularly, the channel response estimation in the timing recovery loop is dynamically adapted to the current channel response. More particularly, the channel estimation coefficients used in a channel estimator can be adapted based on an error signal representing the difference between a received signal at the timing recovery loop and an estimated signal output from a channel estimator. Further, to prevent undesirable interaction between the channel estimator and the overall timing recovery loop with respect to clock phase recovery, the adaptation of channel estimation can be controlled in terms of speed or time so as to limit or eliminate the channel estimator's effect on clock phase correction.

Figure 1:
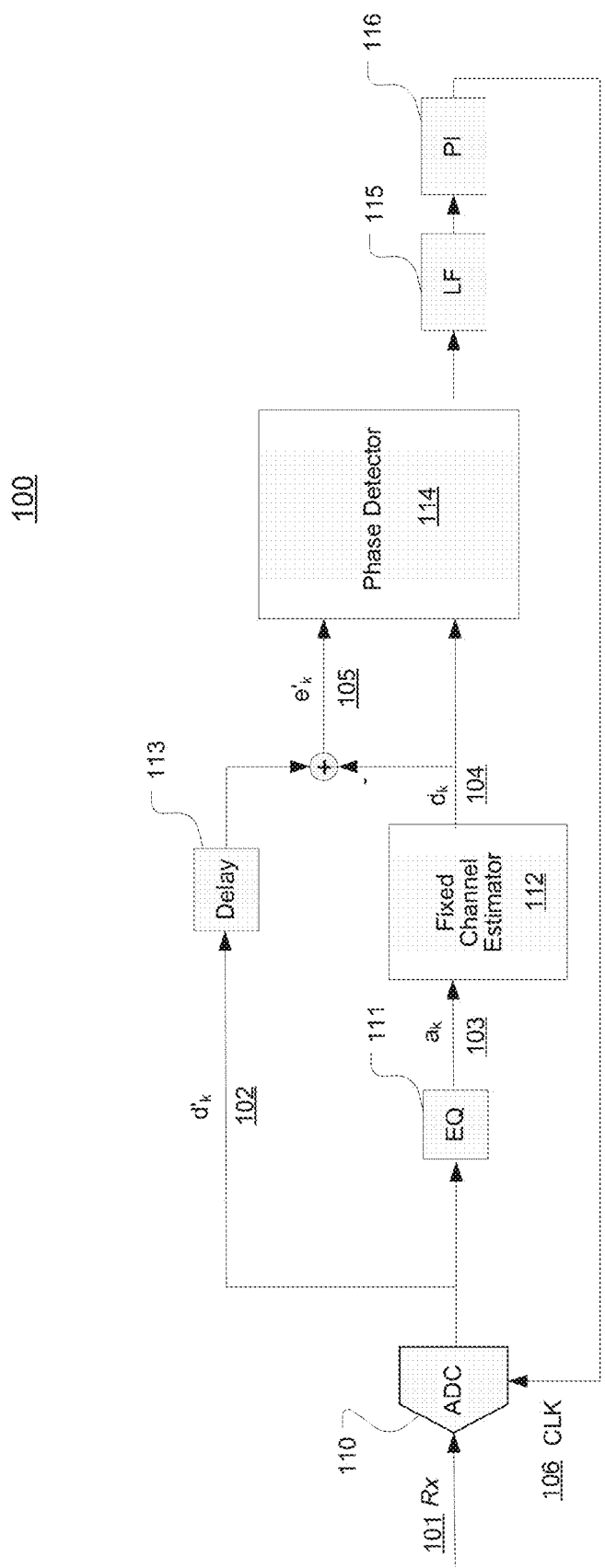
FIG. 1 illustrates the configuration of a timing recovery loop in a receiver according to the prior art.
Figure 2:
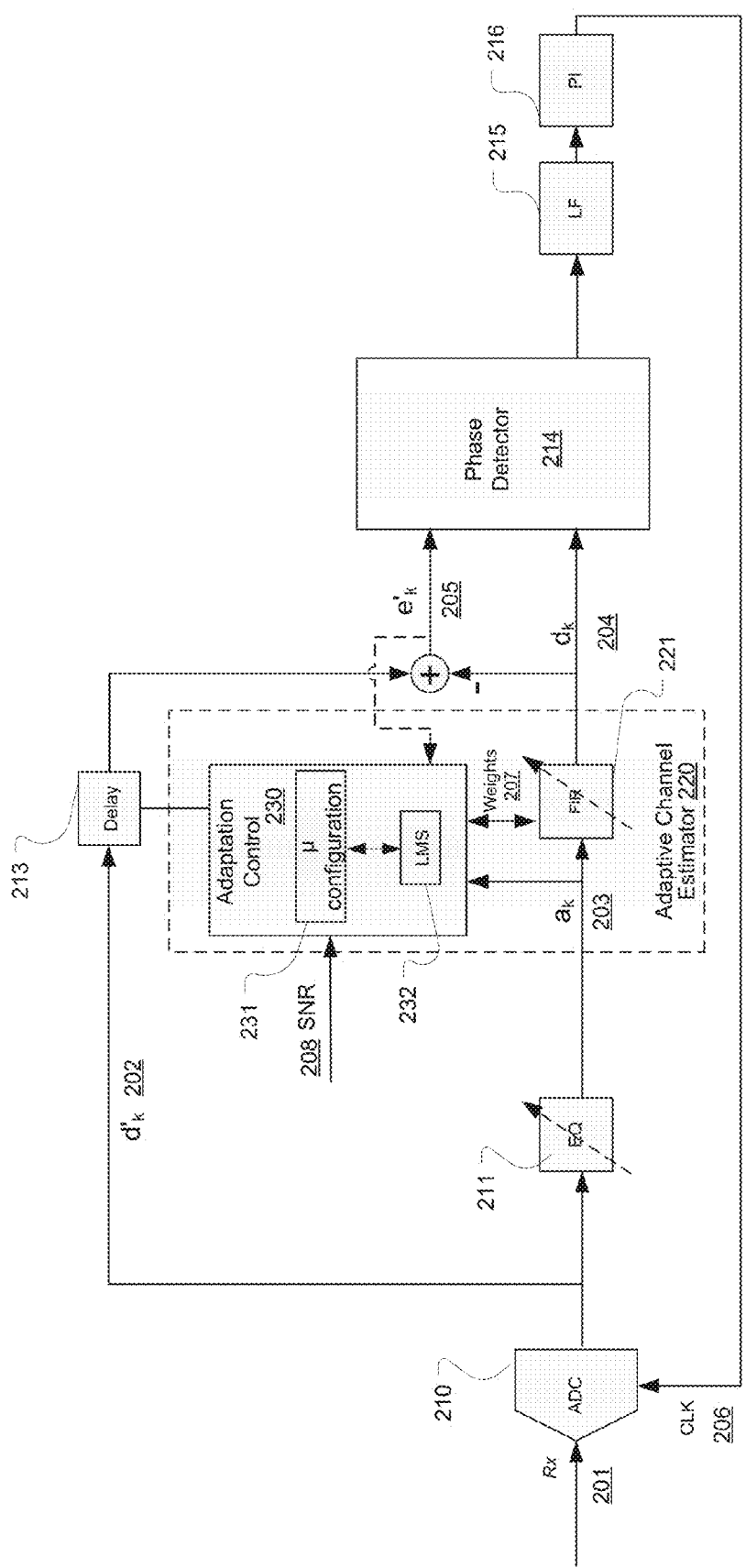
FIG. 2 illustrates a configuration of an exemplary timing recovery loop with an adaptive channel estimator according to an embodiment of the present disclosure.

FIG. 2 illustrates a configuration of an exemplary timing recovery loop 200 with an adaptive channel estimator according to an embodiment of the present disclosure. The timing recovery loop 200 includes an Analog-to-Digital Converter (ADC) 210, an equalizer 211, an adaptive channel estimator 220, a delay element 213, a phase detector 214, a loop filter 215, and a phase interpolator 216. A received analog signal $R_x$ 201 is converted to a digital signal $d_k'$ 202 and then supplied to the equalizer 211 and the delay element 213. An equalized signal $a_k$ 203 is output from the equalizer 211 and supplied to the adaptive channel estimator 220. The channel estimator 220 applies an estimated channel response (or channel impulse response) to generate an estimated signal $d_k$ 204.

The equalizer 211 may be a Feed Forward Equalizer (FFE) implemented using a Finite Impulse Response (FIR) filter or a decision-directed equalizer (DDE). In some embodiments, the FIR filter in the equalizer 211 utilizes fixed tap weights and, thus, a fixed channel response estimation. In some other embodiments, the equalizer 211 is adaptive to the time-varying channel response, for example, according to an LMS adaptation process with programmable step sizes. Examples of adaptive equalizers are disclosed in detail in the co-pending U.S. patent application Ser. No. 14/619,952, titled "CLOCK PHASE ADAPTATION FOR PRECURSOR ISI REDUCTION."

The delay element 213 is programmable and delays the ADC output according to the delays in the equalizer 211 and the channel estimator 220. In this manner, the characteristics of the delayed signal 203 have become known to the equalizer 211 and the channel estimator 220. In some embodiments, the delay element 213 extracts a training sequence from the data stream for the channel estimation adaptation process.

The phase detector 214 generates a phase error based on the difference between the delayed signal (output from the delayed element 213) and the estimated signal $d_k$ 204. The phase error is averaged at the loop filter 215, and the clock phase is accordingly adjusted at the phase interpolator 216. As a result, a recovered clock signal 206 is output from the phase interpolator 216 and, in turn, used to drive the ADC 210 for sampling as well as for downstream processing logic (not shown).

According to the present disclosure, the adaptive channel estimator 220 is configured to dynamically adjust the estimated channel response of a communication channel through which the signal 201 is transmitted. In channel estimators that characterize a channel response using a correlation of a set of channel estimation coefficients (e.g., arranged in a channel matrix), the channel estimation coefficients can be adapted based on the detected channel response variation over time. As a result, the timing recovery loop 200 can dynamically and accurately compensate for the channel distortion and noise applied by the channel.

It will be appreciated that the present disclosure is not limited to any specific type of channel estimator or any specific process or mechanism of characterizing a channel response. For example, a channel estimator performs channel estimation based on training symbols inserted in the data stream. The implementation of the adaptation control logic is dependent on the adaptive process in the specific embodiment, such as an LMS adaptation process or any other method that is well-known in the art. The adaptation control logic may be implemented using logic circuitry, a programmable microcontroller, a combination thereof, or any other suitable means.

In this example, the channel estimator 220 includes an FIR filter 221 operable to generate an estimated signal $d_k$ 204 using multiple taps, for instance, 8 taps. Controlled by the adaptation control logic 230, the tap weights of the FIR filter 221 are adapted to the error signal $e_k'$ 205, which corresponds to the difference between the received signal $d_k'$ 202 with an added delay and the estimated signal output from the FIR filter 221. The tap weights are updated through an LMS adaptation process, e.g., representable as $$C_i(k+1)=C_i(k)+\mu_i \cdot e_k' \cdot a_k \quad \text{(Equation 1)}$$

where: $C_i(k)$ represents the weight of the $i^{th}$ tap at time k; $C_i(k+1)$ represents the weight of the $i^{th}$ tap at time k+1; $\mu_i$ represents the adaptation step size for the $i^{th}$ tap; $e_k'$ represents the estimation error 205 at time k; and $a_k$ represents the signal 203 input to the FIR filter at time k.

The adaptation step size $\mu_i$ may remain fixed or vary during the channel estimation adaptation process in different embodiments. As shown, the adaptation control logic 230 employs a µ-configuration module 231 to control the adaptation step size for each tap weight automatically based on a detected sNR 208, as described in greater detail below. Alternatively, the µ-configuration module 231 can output user-defined adaptation step sizes. The LMS module 232 in the adaptation control logic 232 implements an LMS adaptation process to iteratively modify the tap weights 207 of the FIR filter 221 according to Equation 1.

The phase detector 214, loop filter 215, and phase interpolator 216 can be implemented in any suitable configuration that is well-known in the art. A timing recovery loop with adaptive channel estimation may include various other components that are well-known in the art without departing the scope of the present disclosure.

For example, the phase detector 214 is symbol-based and can be a Type A or Type B phase detector implemented according to the Mueller Muller algorithm.

Figure 3:
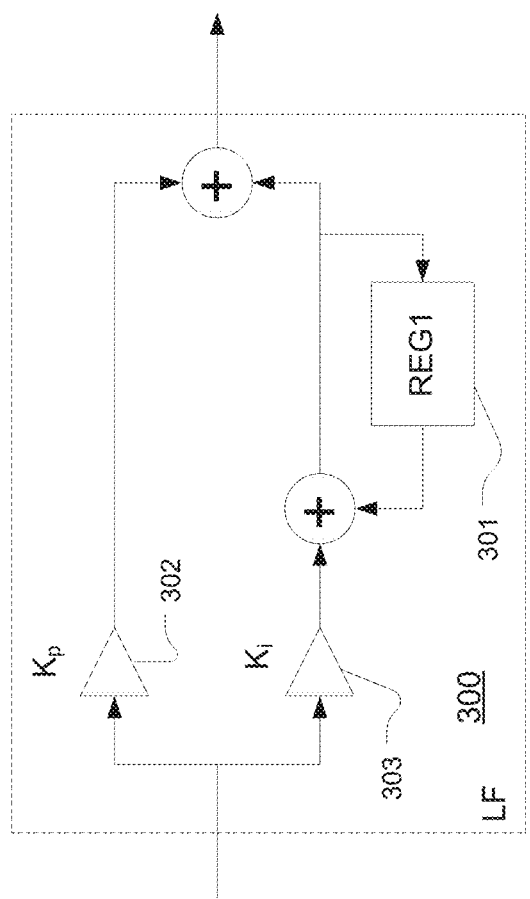
FIG. 3 illustrates an exemplary loop filter that can be used in a timing recovery loop in accordance with an embodiment of the present disclosure.

The loop filter 215 can be a typical digital filter for a second-order Phase Lock Loop (PLL). FIG. 3 illustrates an exemplary loop filter 300 that can be used in a timing recovery loop in accordance with an embodiment of the present disclosure. The loop filter uses a register 301 to control the frequency offset of the downstream phase interpolator or Voltage-Controlled Oscillator (VCO). The adaptation coefficients $K_p$ and $K_i$ can be programmable and used to control the timing recovery loop bandwidth and other behavior.

The phase interpolator 216 may include a VCO combined with a PLL. Alternatively, the phase interpolator 216 may use a programmable gain element, a digital interpolator, and/or an analog interpolator. For example, the digital interpolator includes a register and an adder. The analogy phase interpolator receives a reference clock and outputs a clock signal with a phase that is a function of the input.

Figure 4:
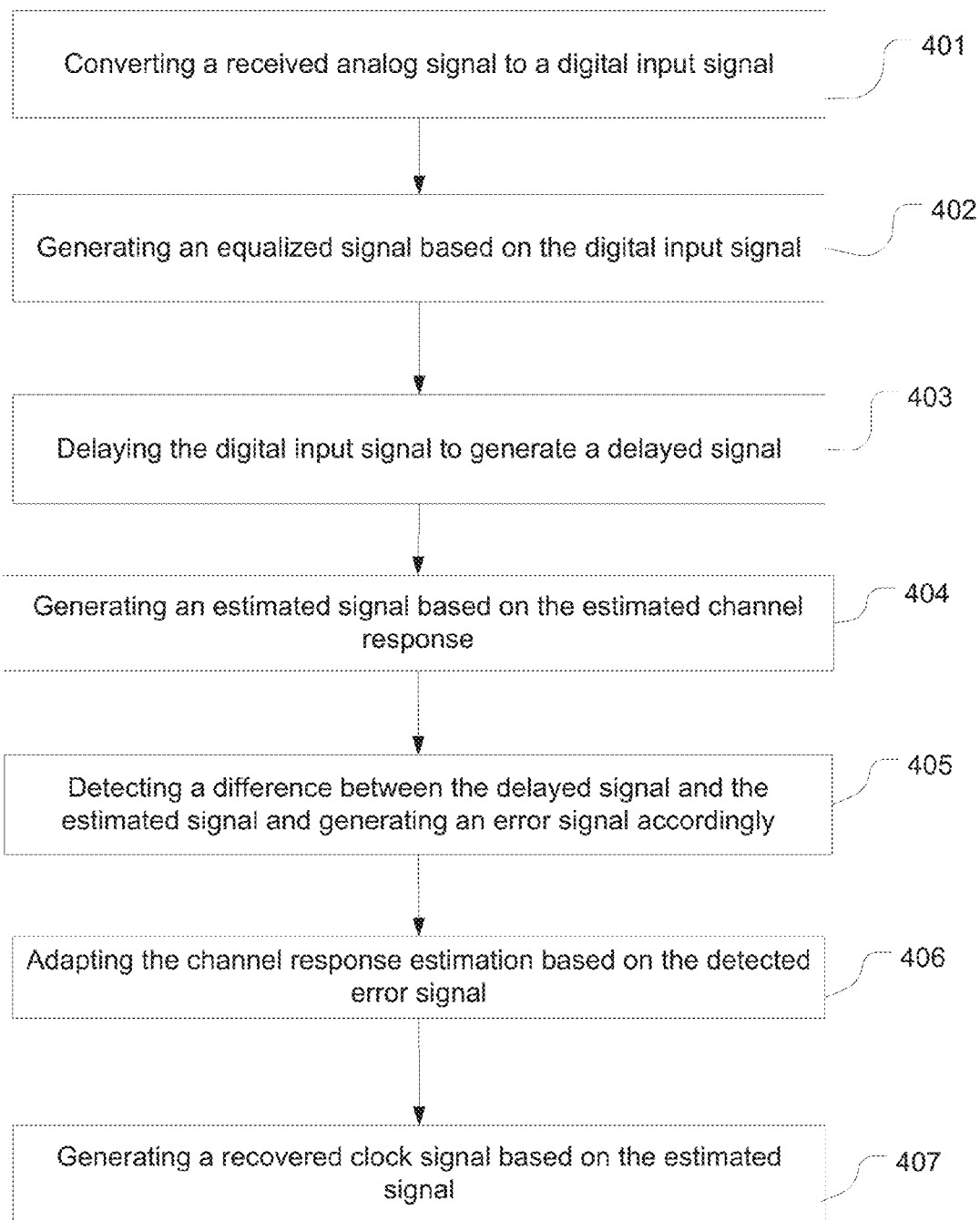
FIG. 4 is a flowchart depicting an exemplary process of generating a recovered clock signal based on adaptive channel response estimation according to an embodiment of the present disclosure.

FIG. 4 is a flowchart depicting an exemplary process 400 of generating a recovered clock signal based on adaptive channel response estimation according to an embodiment of the present disclosure. Process 400 may be performed by a timing recovery loop as shown in FIG. 2 for example. At 400, an analog signal is received at the input of the receiver and converted to a digital input signal through Analog-to-Digital conversion. At 402, an equalized signal is generated at the equalizer based on the digital input signal 402.

At 403, a delay is added to the digital input signal to generate a delayed signal. The delay is programmed such that the delayed signal has been processed and become known to the timing recovery loop. The equalized signal is supplied to the channel estimator to generate an estimated signal at 404 based on the current channel response estimation.

At 405, an error signal is generated by subtracting the delayed signal from the estimated signal and used to adjust the channel response estimation at 406. More specifically, the channel estimation coefficients in the FIR filter are updated iteratively according to an LMS adaptation process so as to minimize the error signal. Thus, the channel response estimation is dynamically adjusted to the variations in the channel response, which is reflected in the error signal. As a result, a recovered clock signal can be generated based on the estimated signal at 407.

When applying an estimated channel response to generate an estimated signal, the channel estimator tends to correct the clock delay in the signal as well as the channel response. This may cause interaction with the timing recovery loop with respect to clock delay correction, which may be undesirable in some situations. The interaction is more pronounced in the case of adaptive channel response estimation. For example, the delay of an FIR filter in a channel estimator is related to the location of a reference tap (RefTap) and may include additional delay due to implementation.

According to the present disclosure, the adaptation of channel response estimation can be controlled in time length or speed to minimize such interaction. In some embodiments, upon good SNR being achieved, the adaptation process is frozen or paused by freezing the tap weights of the FIR filter. For example, a µ-configuration module (e.g., 231 in FIG. 2) is configured to set the adaptation step sizes for all of the taps to 0 once the SNR of the equalized signal is determined to be greater than a threshold value. Alternatively, after achieving a satisfactory SNR, only the weights of the main three taps of the channel estimation filter are frozen, e.g., by setting their step sizes to zero, whereas the other tap weights continue to be adapted.

In some other embodiments, the adaptation of channel estimation is intentionally configured to be slow relative to the speed of the timing recovery loop. For instance, the adaptation time is controlled to be ten times less than $$\frac{1}{BW}$$

of the timing recovery loop, where BW represents bandwidth. This can be implemented by setting very small adaptation step sizes for all of the tap weights. For instance, a step size is set to be in the magnitude of $2^{-15}$ as opposed to a typical step size of $2^{-10}$ in an LMS filter. In some embodiments, the adaptation of a set of selected taps of the channel estimation filter is configured to be slow with reference to $$\frac{1}{BW}$$

of the timing recovery loop, whereas the other taps are adapted to the channel variations over time at a higher speed than the three main taps. For example, the selected taps are the three main taps including the tap before the RefTap, the RefTap and the tap after the RefTap, where the RefTap is the tap with the largest weight. The adaptation speed is controlled by setting small step sizes for the first three main taps.

Figure 5:
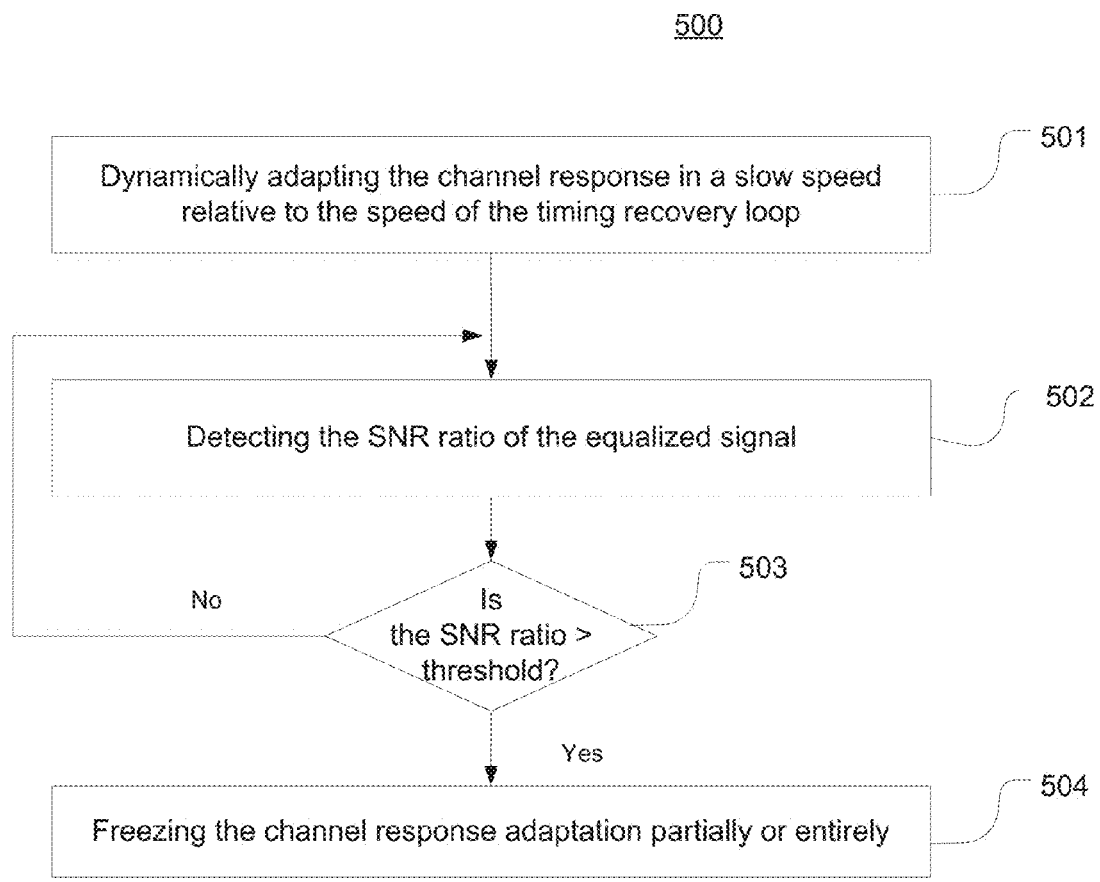
FIG. 5 illustrates an exemplary process of controlling channel response adaptation time according to an embodiment of the present disclosure.

FIG. 5 illustrates an exemplary process 500 of controlling channel response adaptation time according to an embodiment of the present disclosure. Process 500 can be performed by the adaptation control logic in a channel estimator, e.g., 230 in FIG. 2. At 500, the μ-configuration module determines the respective step sizes to update the first set of tap weights based on the bandwidth of the timing recovery loop. The first set of tap weights may include all or a selected set of the tap weights in the channel estimation filter.

As noted with reference to FIG. 3, since the adaptive coefficients in the loop filter $K_p$ and $K_i$ control the speed of the timing recovery loop, $K_p$ and $K_i$ can be input to the μ-configuration module 231 for deriving the bandwidth of the timing recovery loop and, thereby, determining appropriate step sizes of the tap weights in the adaptation process.

At 502, the first set of tap weights are iteratively updated based on the estimated signal, the error signal, and the respective step sizes according to the LMS adaptation process, as shown in Equation 1.

At 503, the SNR of the equalized signal is evaluated and used as the performance indicator of channel response estimation. At 504, it is determined whether the SNR is greater than the threshold. If yes, the adaptation step sizes of a second set of tap weights are set to zero and, thereby, the adaptation of these taps is stopped. The first and second sets may include the same or a different selection of tap weights. It will be appreciated that any other suitable parameter that is well-known in the art can also be used for an indicator that operates to trigger freezing of the adaptation process.

Figure 6:
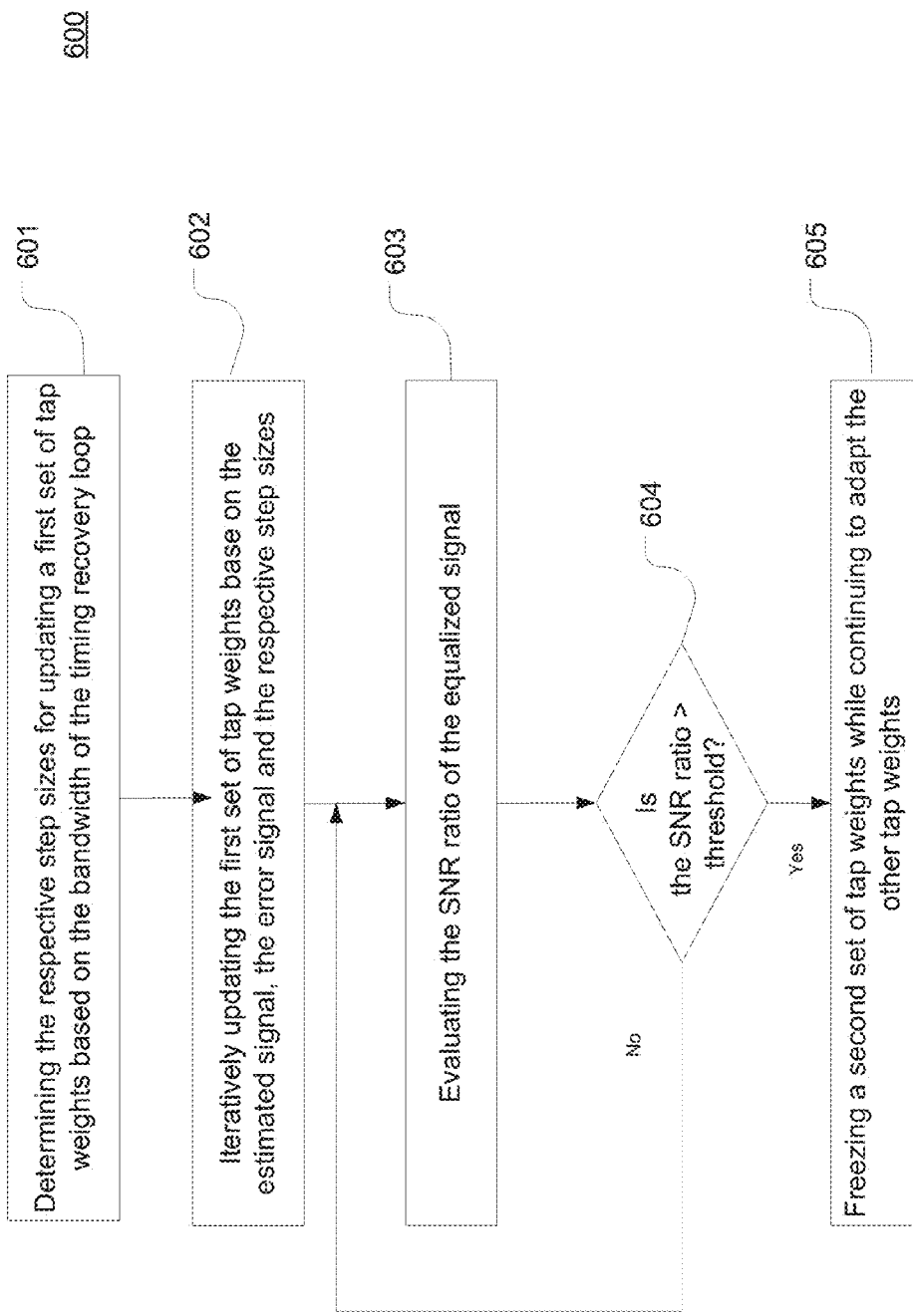
FIG. 6 illustrates an exemplary process of controlling channel response adaptation speed according to another embodiment of the present disclosure.

FIG. 6 illustrates an exemplary process 600 of controlling channel response adaptation speed according to another embodiment of the present disclosure. Process 600 can also be performed by the adaptation control logic in a channel estimator, e.g., 230 in FIG. 2. At 601, the channel response is dynamically adapted in a slow speed. The speed is determined based on the bandwidth of the entire timing recovery loop. At 602, the SNR of the equalized signal, or any other parameter that indicates channel estimation performance, is detected and evaluated against a threshold value at 603. An SNR can also be obtained at the output of a slicer coupled to the equalizer. At 604, the adaptation of channel response estimation is stopped partially or entirely. As such, the tap weights that have been updated in the adaptation process are fixed and used for subsequent channel estimation.

Figure 7:
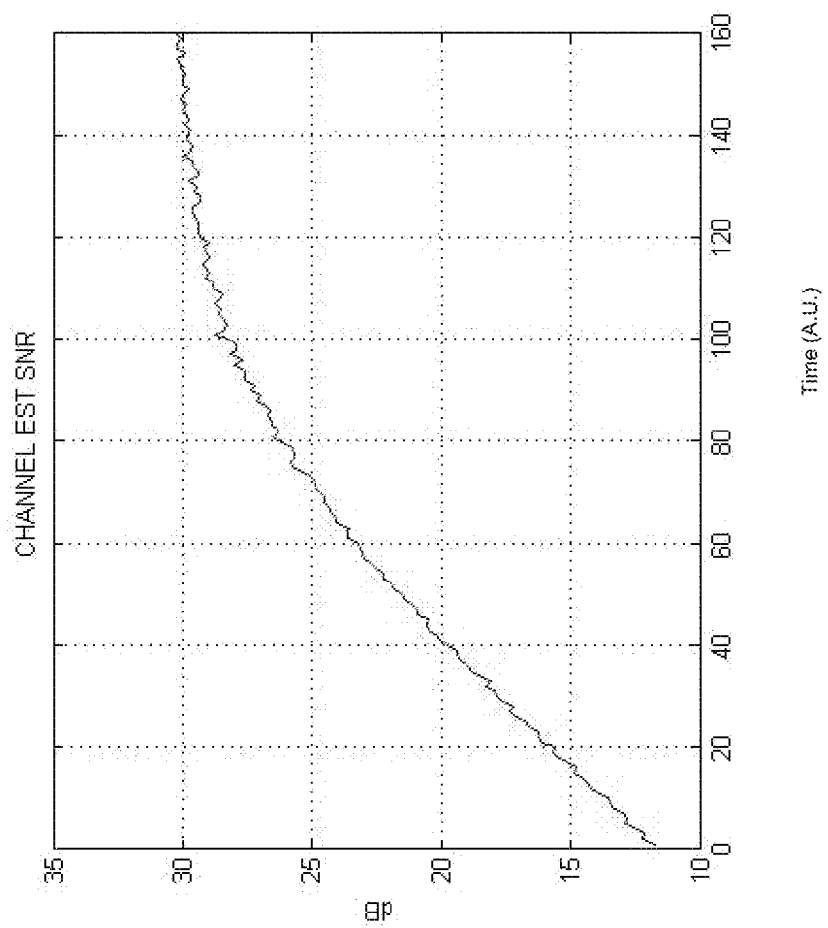
FIG. 7 is a data plot showing the sample SNR that varies over time in a timing recovery loop in accordance with an embodiment of the present disclosure.

FIG. 7 is a data plot showing a sample SNR that varies over time in a timing recovery loop in accordance with an embodiment of the present disclosure. In this experiment, the starting SNR is low, about 12 dB at time=0 A.U. The timing recovery loop uses adaptive channel estimation, but freezes the adaptation once a good SNR is achieved, e.g., 27 dB at time=120 A.U. The timing recovery loop is able to obtain high SNR, e.g., 30 dB at time=160 A.U. This proves that, by freezing the adaptation, the interaction between the timing recovery loop and the channel estimation adaptation with respect to clock delay correction is effectively suppressed.

Figure 8B:
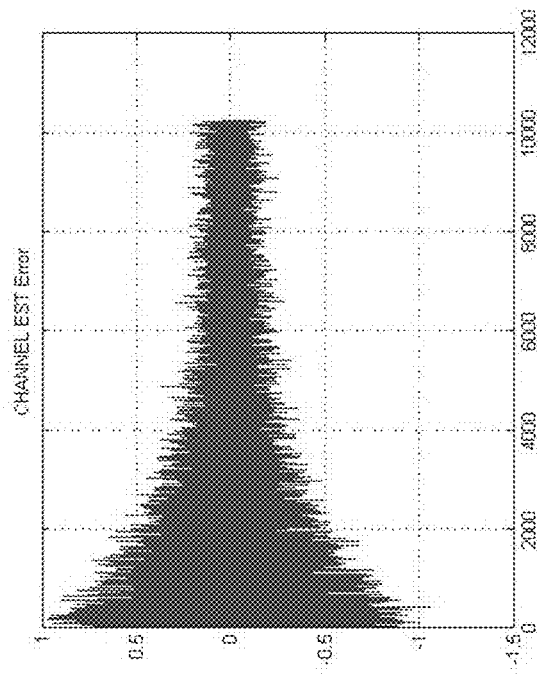
FIG. 8B is a data plot showing the sample channel estimation error that varies over time in the timing recovery loop in accordance with an embodiment of the present disclosure.
Figure 8A:
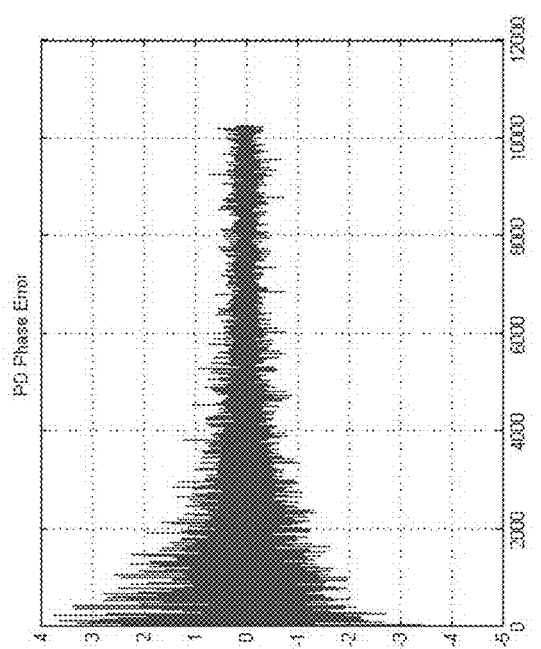
FIG. 8A is a data plot showing the sample phase error output from the phase detector that varies over time in a timing recovery loop in accordance with an embodiment of the present disclosure.
Figure 9:
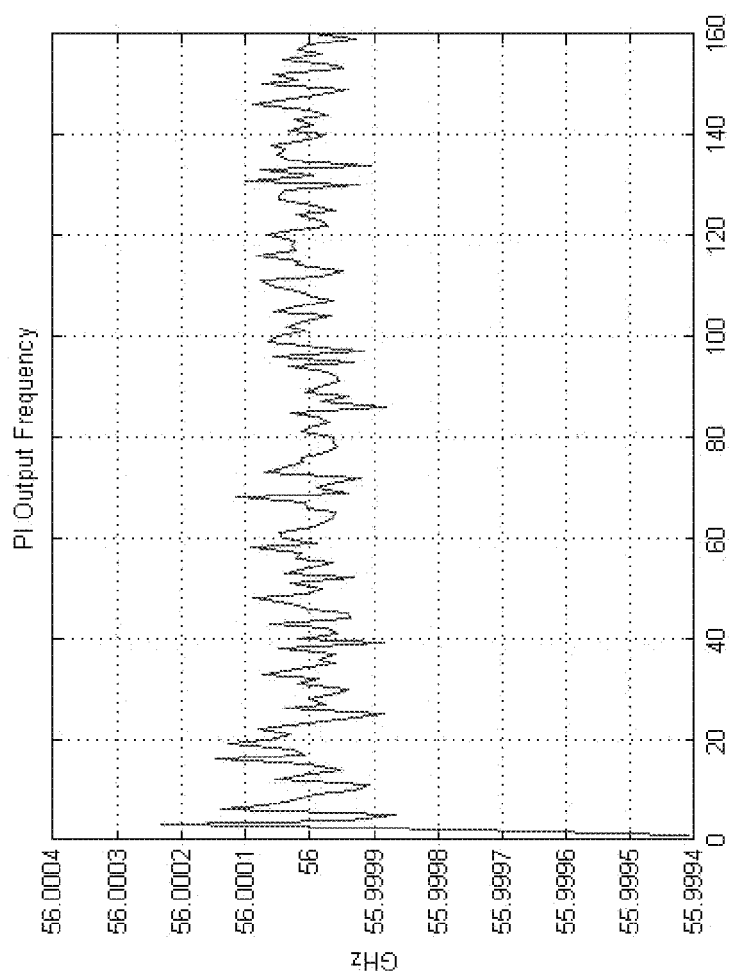
FIG. 9 is a data plot showing the sample output from the phase interpolator as a function of time in accordance with an embodiment of the present disclosure.

FIG. 8A is a data plot showing the sample output from the phase detector that varies over time in a timing recovery loop in accordance with an embodiment of the present disclosure. FIG. 8B is a data plot showing the sample channel estimation error that varies over time in the timing recovery loop in accordance with an embodiment of the present disclosure. FIG. 9 is a data plot showing the sample output from the phase interpolator as a function of time in the timing recovery loop. In the experiment producing data plots in FIGS. 8A-9, the timing recovery loop uses adaptive channel response estimation but freezes the adaptation once a good SNR has been achieved. FIGS. 8A-9 further demonstrate that a timing recovery loop according to the present disclosure is capable of achieving a satisfactory clock signal by effectively suppressing the undesirable interaction between the timing recovery loop and the channel estimation adaptation with respect to clock delay correction.

What is claimed is:

1. A method of timing recovery for signals transmitted via serial links, said method comprising:
   generating an equalized signal responsive to a digital input signal;
   generating an estimated signal responsive to said equalized signal according to an estimated channel response;
   dynamically adapting said estimated channel response based on a current channel response that varies with time;
   generating an error signal representing a difference between said estimated signal and said digital input signal, wherein said dynamically adapting is based on said error signal;
   generating a recovered clock signal based on said estimated signal;
   determining a Signal-to-Noise Ratio (SNR) of said equalized signal; and
   responsive to a determination that said SNR is greater than a predetermined value, pausing said dynamically adapting said estimated channel response.

2. The method of claim 1, wherein said generating said estimated signal comprises applying a Finite Impulse Response (FIR) filteron said equalized signal, and wherein said dynamically adapting comprises adapting tap weights of said FIR filter based on said error signal.

3. The method of claim 2, wherein said dynamically adapting said tap weights are performed according to a least-mean-square (LMS) adaptation process, and wherein, further, said adapting said tap weights comprises modifying a selected tap weight based on a product of said error signal, said estimated signal, and a step size.

4. The method of claim 3, wherein said step size is determined based on a bandwidth of a timing recovery loop, and wherein, further, dynamically adapting said estimated channel response results in no clock delay correction.

5. The method of claim 2, wherein said pausing said dynamically adapting comprises selectively pausing said adapting said tap weights.

6. The method of claim 5, wherein said selectively pausing comprises setting a step size associated with a tap weight to zero.

7. The method of claim 1 further comprising:
generating said digital input signal based on a received analog signal that is transmitted via a communication channel;
detecting a phase error between said error signal and said estimated signal;
sending said phase error to a loop filter and a phase interpolator to generate said recovered clock signal; and
feeding back said recovered clock signal for said generating said digital input signal.

8. A device for signal processing, said device comprising:
an equalizer configured to generate an equalized signal responsive to a digital input signal;
a channel estimator coupled to said equalizer and configured to apply an estimated channel response to said equalized signal to generated and estimated signal;
an adder configured to generate an error signal based on a difference between said estimated signal and said digital input signal; and
adaptation logic coupled to said channel estimator and configured to:
dynamically adapt said estimated channel response based on said error signal; and
suspend adapting said estimated channel response responsive to a determination that a Signal-to-Noise Ratio (SNR) of said equalized signal is greater than a predetermined value.

9. The device of claim 8 further comprises:
an Analog-to-Digital converter (ADC) coupled to said equalizer and configured to generate said digital input signal based on a received analog signal that is transmitted via a communication channel;
a phase detector;
a loop filter; and
a phase interpolator configured to output said recovered analog signal and feed said recovered analog signal to said ADC.

10. The device of claim 9, wherein said channel estimator comprises a Finite Impulse Response (FIR) filter, and wherein said adaptation logic is configured to adapt tap weights of said FIR filter according to a least-mean-square (LMS) adaptation process and based on a product of said error signal, said estimated signal, and a step size.

11. The device of claim 10, wherein said adaptation logic is configured to suspend adaptation of selected tap weights of said FIR filter upon a determination that a SNR ratio of said equalized signal is greater than a predetermined value.

12. The device of claim 10, wherein a step size is smaller than a reciprocal of a bandwidth of a timing recovery loop for said digital input signal, wherein said timing recovery loop comprises said equalizer and said channel estimate filter.

13. The device of claim 8, wherein said adaptation logic is configured to adapt said estimated channel response without correcting a clock delay associated with said digital input signal.

14. A receiver comprising:
an Analog-to-Digital Converter (ADC) configured to generate a digital input signal based on a received analog signal that is transmitted via a communication channel and, further, based on a recovered clock signal;
a timing recovery loop coupled to said ADC and configured to generate said recovered clock signal, wherein said timing recovery loop comprises:
an equalizer coupled to said ADC and configured to generate an equalized signal responsive to said digital input signal;
a channel estimation filter coupled to said equalizer and configured to apply an estimated channel response to said equalized signal to generate an estimated signal;
an adder configured to generate an error signal based on a difference between said estimated signal and said digital input signal; and
adaptation logic coupled to said channel response filter and configured to dynamically adapt said estimated channel response based on said error signal, wherein said channel estimation filter is configured to generate said estimated signal without correcting a clock delay associated with said digital input signal, wherein said adaptation logic is further configured to suspend adapting said estimated channel response responsive to a determination that a Signal-to-Noise Ratio (SNR) of said equalized signal is greater than a predetermined value.

15. The device of claim 14, wherein said channel estimation filter comprises a Finite Impulse Response (FIR) filter, and wherein said adaptation logic is configured to adapt tap weights of said FIR filter according to a least-mean-square (LMS) adaptation process and based on a product of said error signal, said estimated signal, and a step size.

16. The device of claim 15, wherein said adaptation logic is further configured to determine said step size based on a bandwidth of a timing recovery loop for said digital input signal.

* * * * *